Feb. 8, 1938.                M. GRABARSE ET AL                2,107,785
                    VARIABLE PITCH PROPELLER FOR AIRCRAFT
                           Filed Aug. 19, 1935
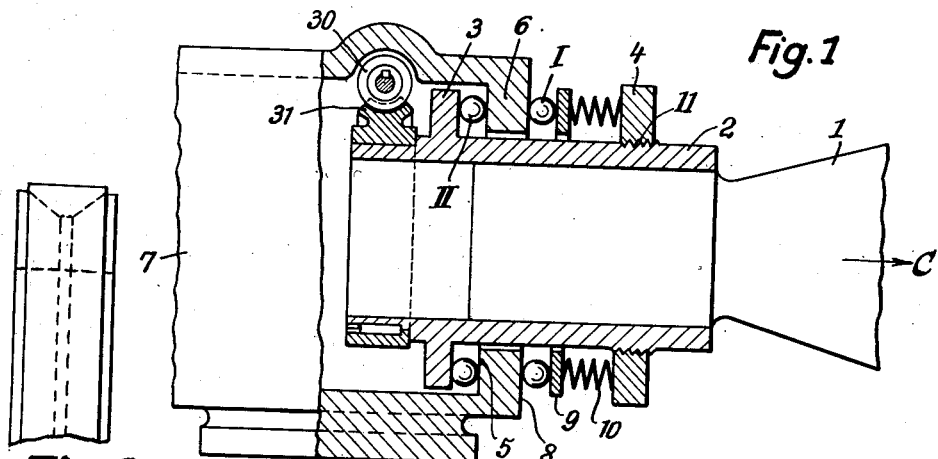
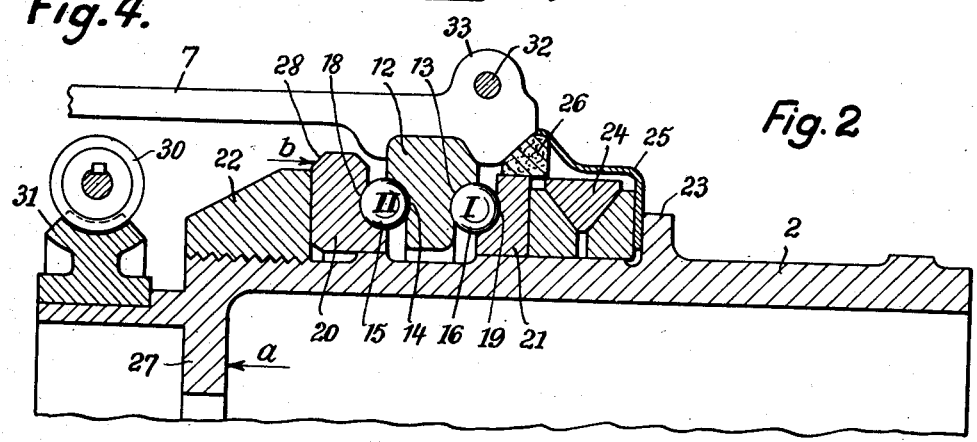
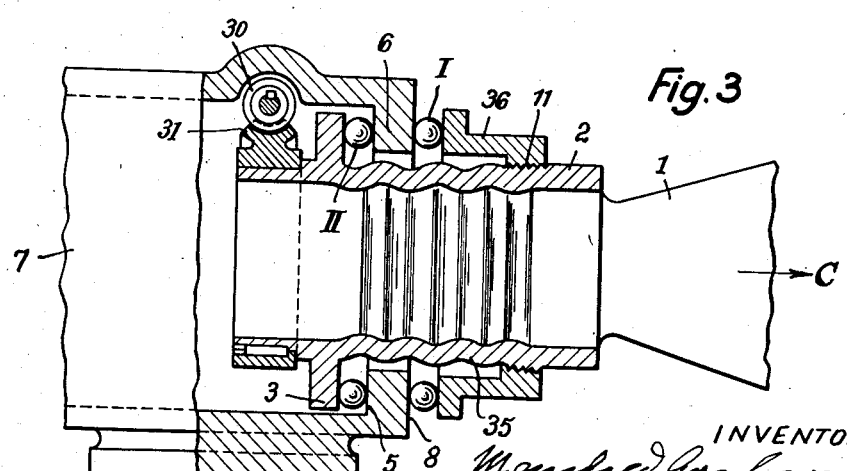

Patented Feb. 8, 1938

2,107,785

UNITED STATES PATENT OFFICE 2,107,785

VARIABLE PITCH PROPELLER FOR AIRCRAFT

Manfred Grabarse and Ludwig Hoffmann, Berlin-Hermsdorf, Germany, assignors to Gustav Schwarz G. m. b. H., Berlin-Waidmannslast, Germany Application August 19, 1935, Serial No. 36,768
In Germany August 23, 1934

12 Claims. (Cl. 170—162)

Our invention relates to improvements in variable pitch propellers for air craft. In variable pitch propellers for air craft the blades are mounted in the hub so that they are adapted to be turned about their longitudinal axes for varying the pitch, and for this purpose the blades are mounted on the hub by means of two coaxial bearings. The extremely high centrifugal forces developed in service produce elastic deformation of the mounting of the blades whereby the supporting faces of one of the bearings are separated from each other and the blade is supported only by the other bearing which takes up the centrifugal force. Therefore the blade has a certain play, and it is subject to slight movement particularly transversely of its axis by the action of vibrations and variations of the moment of the engine. This is objectionable in the operation of the propeller and it interferes with safe service, and the bearings are subject to strong wear.

The object of the improvements is to mount the blade in the hub so that it is free of clearance under any load and that it is therefore held in the correct position under any conditions of service. With this object in view our invention consists in subjecting the bearings to initial pressure in axial direction so that under any conditions of service both bearings are under pressure.

The invention may be carried out in different ways. In one embodiment of the invention a spring or springs are provided to which an initial loading of such an amount in given that they are slightly extended by the deformation of the parts of the blade mounting by centrifugal action without at any time being completely extended, the said spring or springs continuously holding the bearings under pressure. The said spring or springs may be provided at any suitable part of the mounting, and preferably they are located so that they do not take part in the transmission of the centrifugal force from the blade to the hub.

In another embodiment of the invention the spring action is produced by certain parts of the hub or the root of the blade which are constructed so as to be capable of elastic deformation, and which give an initial loading to the bearings. In this case the initial loading will ordinarily be equal to the highest centrifugal force developed in service, so that the said centrifugal force is not able to deform the said elastic part or parts of the hub or the root of the blade and thereby to separate the bearing faces of the bearings from each other. The same principle applies in such constructions in which a spring or springs are provided which take part in the transmission of the centrifugal force.

Ordinarily the bearings are held together by means of an annular nut or nuts screwed on the root of the blade or the sleeve in which the said root is fixed. By reason of the large diameter the friction developed by turning the said nut is so high that it is impossible to give the necessary initial loading to the spring or springs. Therefore, when the device is assembled the parts are extended or compressed by means of a press or a tensioning device, and the holding devices such as the said annular nuts are brought into the proper positions after the deformation necessary for giving initial loading has been imparted to the said parts.

For the purpose of explaining the invention several examples embodying the same have been shown in the accompanying drawing in which the same reference characters have been used in all the views to indicate corresponding parts. In said drawing, Fig. 1 is a diagrammatical sectional elevation illustrating an embodiment of the invention, Fig. 2 is a similar sectional elevation showing a modification, Fig. 3 is a diagrammatical sectional elevation similar to the one illustrated in Fig. 1 and showing another modification, and Fig. 4 is an elevation showing a detail.

In the diagrammatical elevation shown in Fig. 1 the blade I is fixed within a sleeve 2 which is formed with a rib 3 and with screw-threads 11 engaged by an annular nut 4. The rib 3 bears on an inwardly directed flange 6 of a hub 7 through the intermediary of an anti-friction bearing II comprising balls and a race way 5. The outer side of the flange 6 provides a race way 8 for an anti-friction bearing I comprising a race ring 9, the said ring 9 being elastically supported on the nut 4 by means of springs 10. The tension of the springs 10 may be varied by turning the nut 4 on the screw-threads 11.

Any known or preferred means are provided for varying the pitch of the propeller. As shown a worm gearing is provided for this purpose, which comprises a worm 30 mounted in suitable bearings of the hub 7 and engaging in a toothed segment 31 fixed to the inner end of the sleeve 2, the worm being connected with automatic or hand operated mechanism for rotating the same. Mechanism of this type is known in the art and We deem it not necessary to describe the same in detail.

In service centrifugal force is developed by the blade 1 which has been indicated in Fig. 1 by the letter C'. For the purpose of illustrating the object of the springs 10 it may be assumed for the present that the said springs are not provided, and that the nut 4 immediately bears on the anti-friction bearing I. If now centrifugal force C' is developed the pressure in the bearing II is increased and that in the bearing I is reduced, because the parts, and more particularly the sleeve 2, are slightly deformed by elasticity. If however the springs 10 are provided, and if initial loading of such an amount is given thereto by means of the nut 4 that the said loading is not reduced to zero with any practical deformation of the parts by centrifugal action, the bearing I is not made loose, and therefore the injurious action of a change of pressure in the bearing caused by oscillations and vibrations is obviated.

Fig. 2 shows a practical embodiment of the invention. The blade is fixed in a sleeve 2 which is rotatable within the hollow hub 7. The aforesaid anti-friction bearings I and II are combined into a double step bearing, and for this purpose a race ring 12 which is common to both anti-friction bearings is fixed within the said hub, which for this purpose is made in two sections connected with each other by screw bolts 32 passed through eyes 33. The race ring 12 comprises two race ways 13 and 14 for balls 15 and 16. The outer race rings 20 and 21 which are formed with race ways 18 and 19 are fixed to the sleeve 2, the race ring 20 being supported by means of an annular nut 22 mounted on the inner screw-threaded end of the sleeve 2 and the race ring 21 being supported on a collar 23 of the sleeve 2 through the intermediary of an annular spring 24 device composed of three elastic rings formed with wedge-shape engaging faces as is shown in Figs. 2 and 4, the last named figure showing an elevation of the said spring device. A cap 25 and a packing ring 26 protect the bearings from the access of dust.

For varying the pitch of the blade a worm gearing 30, 31 is provided, as has been described with reference to Fig. 1.

The annular spring 24 which is made from steel has the function of the springs 10 shown in Fig. 1. When the parts are assembled the whole bearing is first compressed, for example by means of a press exerting pressure on the flange 27 in the direction of the arrow a and towards the axis of the hub and on a shoulder 28 formed on the race ring 20 in the direction of the arrow b for putting the spring under compression, whereupon the annular nut 22 is screwed on the sleeve 2 so that it holds the spring 24 under compression. Thereby initial loading of such an amount is given to the spring that the said loading is never reduced to zero when the parts and particularly the sleeve 2 are deformed by centrifugal force, because the spring follows such deformation without ever being completely extended. Therefore the spring always exerts pressure on the bearing I, so that the parts of the said bearing are always in engagement with each other. It is not always necessary to exert the presure on the parts indicated, but the initial loading may be given to the spring also in another way. However the method described above is preferred for the reason that not only the spring 24 is put under compression, but also the other parts of the device are elastically deformed, and therefore assist the action of the spring 24. More particularly the portion of the sleeve located between the nut 22 and the collar 23 is elastically extended.

The construction shown in Fig. 2 in which the anti-friction bearings are combined into a unit having a common race ring is advantageous for the reason that the length and the weight of the device is reduced to a minimum. Further, the parts may be readily assembled, because after taking the hub apart each blade and its mounting may be removed and mounted in the hub as a unit. Thereby the propeller may be readily handled, the bearings can be readily adjusted, and the parts may be readily repaired.

If the material from which the parts are made is sufficiently elastic, the springs 24 may in some cases be dispensed with and initial loading may be imparted to the said parts by elastic deformation thereof. If desired the shape of the parts may be such as is most suitable for imparting initial tension thereto. This construction in which a part or parts of the mounting provide the elasticity for maintaining the pressure in both bearings has been illustrated in Fig. 3. As is shown in the said figure the springs 10 have been omitted, and in lieu thereof the sleeve 2 is shaped so that it has sufficient elasticity for imparting thereto initial loading by axial extension. For this purpose the inner part 35 of the wall of the sleeve is formed externally and internally with circumferential depressions whereby the wall is wave-like in longitudinal section. In lieu of the race ring 9 and the nut 4 of Fig. 1 an internally screw-threaded sleeve 36 is provided. Otherwise the construction of the hub and the mounting of the blade is the same as has been described with reference to Fig. 1, and the same letters and figures of reference have been used to indicate corresponding parts.

The axial extension of the sleeve 2 is such that the initial tension is equal or substantially equal to the highest value of the centrifugal force which may be developed in service. While the propeller is at rest both bearings I and II are under the same pressure which substantially corresponds to the centrifugal force when rotating. When rotary movement of the propeller is started the increasing centrifugal force at first causes a reduction of the pressure in the bearing I, because the initial tension caused by the axial extension of the sleeve 2 gradually falls off, without the sleeve being further extended. Thus the pressure of the bearing II remains constant. When the centrifugal force attains its maximum which is equal to the initial tension imparted to the sleeve 2 by extension, the pressure in the bearing I is reduced to zero, and thereafter the pressure in the bearing II is gradually increased upon a further increase of the centrifugal force. Thereby the sleeve 2 is extended beyond its initial extension. By imparting the desired extension to the sleeve reduction of the pressure in the bearing II can be entirely avoided.

Practically conditions are somewhat more intricate, because it is not possible to subject only such parts to deformation by initial compression as take part in the transmission of the centrifugal force of the blade. But this does not result in a change of principle. Practically the initial compression will be made such that loosening of the bearings by centrifugal force is obviated.

When the initial compression is such that the highest centrifugal force developed in service is always slightly below the said tension, so that the pressure in the bearing I is never reduced to zero, the frictional moment of the system is in a less degree dependent upon the centrifugal force and therefore particularly favourable, because it is increased proportionally to the centrifugal force. This is particularly important in propellers in which the pitch is automatically regulated.

The principle which has been discussed above exclusively with reference to centrifugal force also applies to other forces, and more particularly to the forces caused by thrust and torsional moment in the bearing of the blade. Fig. 2 illustrates this fact by showing step bearings which are adapted to take up transverse forces. By the inclined race ways of the race rings the axial initial compression of the system is automatically effective also in transverse direction and it causes the blades to be held in the bearings without play against transverse forces.

We claim:

1. A propeller for aircraft, comprising a hub, a blade, a mounting in said hub for said blade permitting said blade to be turned about its axis and comprising bearing surfaces supporting said blade as against movement in opposite directions, and means to hold said bearing surfaces under initial pressure of such an amount that with any load to which the propeller is subjected in service the said bearing surfaces are in engagement with said blade for supporting the same as against movement transverse to the bearing surfaces.

2. Air propeller as claimed in claim 1, comprising a spring having initial loading for holding said bearing surfaces in engagement with said blade.

3. Air propeller as claimed in claim 1, in which a part of said mounting intermediate said bearing surfaces is elastic and under initial loading.

4. A propeller as claimed in claim 1, in which a part of the mounting adapted to hold the bearing surfaces in engagement with the blade has a shape affording high elasticity, said part being under initial loading.

5. A propeller as claimed in claim 1, in which a part of the mounting adapted to hold the bearing faces in engagement with the blade is made internally and externally with circumferential depressions affording high elasticity, said part being under initial loading.

6. A propeller as claimed in claim 1, comprising a sleeve in which the blade is fixed and which is supported between the said bearing surfaces, said sleeve having its cylindrical wall formed internally and externally with circumferential depressions to increase the elasticity thereof and being under initial loading.

7. A propeller as claimed in claim 1, comprising in addition a spring having initial loading and adapted to hold the said bearing surfaces and blade under initial pressure, said spring being located at a part of the mounting of the blade which is located outside the parts transmitting the centrifugal force of the blade, and the initial loading given to the spring being such that it is capable to exert force with any deformation of the parts subjected to centrifugal force.

8. A propeller as claimed in claim 1, comprising in addition a spring having initial loading and adapted to hold the said bearing surfaces and blade under initial pressure, said spring being located at such a part of the mounting of the blade which is located outside the parts transmitting the centrifugal force of the blade, and its initial loading being at least as high as the highest centrifugal force developed in service.

9. A propeller as claimed in claim 1, comprising an annular spring having initial loading and acting on said bearing surfaces, said spring being located coaxially of the blade.

10. A propeller for air craft, comprising a hub having a radial tubular portion provided with internally directed coaxial bearing surfaces, a blade mounted in said hub and adapted to be rotated therein about its axis, said blade having a flange rigidly connected therewith and formed with a bearing surface and located in position for engaging the bearing surface which is near the axis of the hub, a ring axially movable on said blade in position for engaging the bearing surface of the hub remote from the axis of the hub, and a spring tending to press said ring into engagement with the said outer bearing surface of the hub.

11. A propeller for air craft, comprising a hub having a radial tubular portion provided with an inner ring formed with an inner and an outer bearing surface, a blade provided around its root with a sleeve, said sleeve being provided with a fixed ring in position for engaging said inner bearing surface, a ring axially shiftable on said sleeve in position for engaging the said outer bearing surface, and a spring intermediate said ring and sleeve adapted to press said ring into engagement with its bearing surface.

12. A propeller as claimed in claim 1, in which the bearing surfaces form the raceways of coaxial anti-friction bearings having a race ring in common.

LUDWIG HOFFMANN.
MANFRED GRABARSE.